(12) United States Patent
Park et al.

(10) Patent No.: US 12,351,157 B2
(45) Date of Patent: Jul. 8, 2025

(54) HYBRID ELECTRIC VEHICLE AND METHOD OF MOTOR CONTROL FOR THE SAME

(71) Applicants: HYUNDAI MOTOR COMPANY, Seoul (KR); KIA CORPORATION, Seoul (KR)

(72) Inventors: Seong Ik Park, Seoul (KR); Sung Chan Na, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 273 days.

(21) Appl. No.: 17/946,283

(22) Filed: Sep. 16, 2022

(65) Prior Publication Data
US 2023/0119802 A1  Apr. 20, 2023

(30) Foreign Application Priority Data
Oct. 18, 2021 (KR) .......................... 10-2021-0138321

(51) Int. Cl.
*B60W 20/19* (2016.01)
*B60W 10/06* (2006.01)
*B60W 10/08* (2006.01)
*B60W 10/11* (2012.01)

(52) U.S. Cl.
CPC ............ *B60W 20/19* (2016.01); *B60W 10/06* (2013.01); *B60W 10/08* (2013.01); *B60W 10/11* (2013.01); *B60W 2510/083* (2013.01); *B60W 2710/0666* (2013.01); *B60W 2710/083* (2013.01); *B60W 2710/1022* (2013.01)

(58) Field of Classification Search
CPC ...... B60W 20/19; B60W 10/06; B60W 10/08; B60W 10/11; B60W 2510/083; B60W 2710/0666; B60W 2710/083; B60W 2710/1022; F02B 67/00; B60K 1/00; B60K 6/26; B60K 6/547; F02D 2250/00
USPC .......................................................... 701/22
See application file for complete search history.

(56) References Cited

U.S. PATENT DOCUMENTS

| 9,421,966 | B2 | 8/2016 | Yang et al. | |
|---|---|---|---|---|
| 10,099,682 | B1 * | 10/2018 | Johri | ...................... B60W 10/06 |
| 11,958,467 | B2 * | 4/2024 | Toda | ...................... B60K 6/448 |

(Continued)

FOREIGN PATENT DOCUMENTS

| EP | 1199205 A2 * | 4/2002 | ............... B60K 6/46 |
|---|---|---|---|
| EP | 2182620 A1 * | 5/2010 | .............. B60L 11/14 |

(Continued)

*Primary Examiner* — Tuan C To
(74) *Attorney, Agent, or Firm* — MCDONNELL BOEHNEN HULBERT & BERGHOFF LLP

(57) ABSTRACT

A hybrid vehicle (HEV) provides an improved sensation of acceleration. An example method for controlling an engine of an HEV which includes a first motor directly connected to an engine and a second motor located at an input side of a transmission, may include determining a requested torque, determining a compensation torque for compensating an acceleration loss in a shift process based on the requested torque, a torque of the second motor, a torque of the engine and information on the shift, determining an available torque of the first motor, and determining a final torque of the first motor based on the compensation torque and the available torque.

18 Claims, 8 Drawing Sheets

(56) References Cited

U.S. PATENT DOCUMENTS

| | | | | |
|---|---|---|---|---|
| 2010/0273604 A1* | 10/2010 | Imaseki | ................ | B60W 10/08 |
| | | | | 180/65.265 |
| 2018/0273019 A1* | 9/2018 | Johri | ..................... | B60W 10/08 |
| 2020/0346635 A1* | 11/2020 | Wei | ....................... | B60W 30/19 |
| 2021/0054930 A1 | 2/2021 | Benedikt et al. | | |
| 2023/0151886 A1* | 5/2023 | Brockley | ................ | F16H 63/50 |
| | | | | 701/51 |

FOREIGN PATENT DOCUMENTS

| | | | | | |
|---|---|---|---|---|---|
| EP | 3100885 | A1 | * | 12/2016 | ............. B60K 6/36 |
| GB | 2593507 | A | * | 9/2021 | ............. F16H 59/14 |
| JP | 2020-001502 | A | | 1/2020 | |
| JP | 2020-050063 | A | | 4/2020 | |
| KR | 10-1849902 | B1 | | 4/2018 | |
| KR | 2021-0089163 | A | | 7/2021 | |
| WO | WO-2019142036 | A1 | * | 7/2019 | ............. B60K 25/02 |

\* cited by examiner

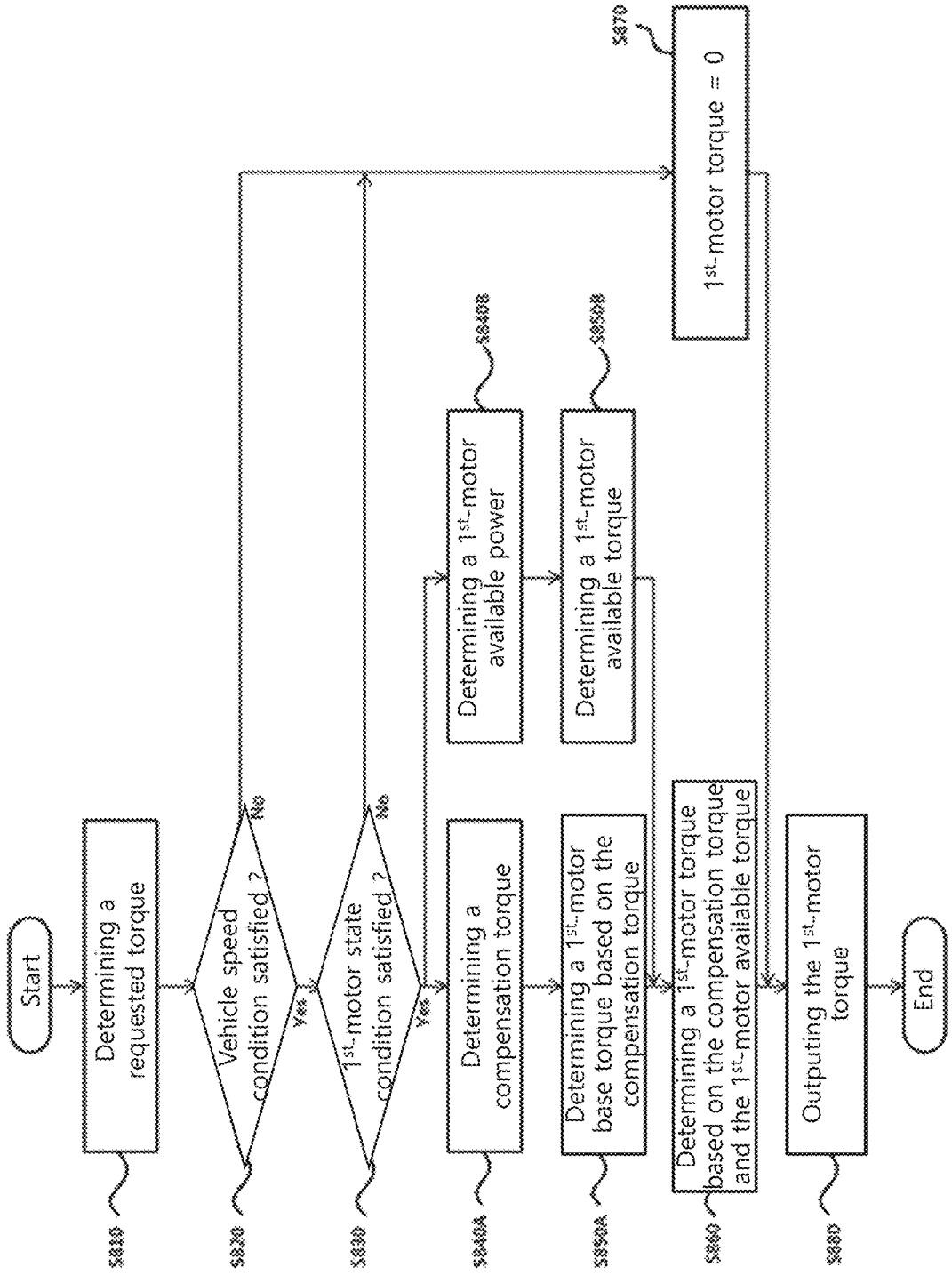

HYBRID ELECTRIC VEHICLE AND METHOD OF MOTOR CONTROL FOR THE SAME

CROSS REFERENCE TO RELATED APPLICATIONS

This application claims the benefit of Korean Patent Application No. 10-2021-0138321, filed on Oct. 18, 2021, which is hereby incorporated by reference as if fully set forth herein.

BACKGROUND

Field

The present disclosure relates to a hybrid vehicle providing improved sensation of acceleration and a method for controlling an engine of the same.

Discussion of the Related Art

Recently, with high interest in environment, the number of eco-friendly vehicles which have a motor as their driving power source are increasing. One of such vehicles is an electrified vehicle a typical example of which is a Hybrid Electric Vehicle (HEV).

The HEV selectively uses a motor and an engine, so that the exhaustion gas is reduced and the gas mileage is increased.

FIG. 1 represents a structure of a powertrain (i.e., drivetrain) of a conventional HEV.

In reference to FIG. 1, the powertrain is for a parallel HEV which has an electric motor (i.e., driving motor) 140 and an engine clutch 130 between an internal combustion engine (ICE) 110, and a transmission 150.

In this type of vehicle, generally, as a driver starts the engine and treads on the accelerator pedal (i.e., accelerator pedal sensor on), first a battery power is used to drive the motor 140 with the engine clutch 130 open, and thus the wheels rotate by the power of the motor via the transmission 150 and a final drive (FD) 160 (i.e., EV mode). As the vehicle slowly moves and needs greater driving power, an auxiliary motor (or starter-generator motor 121) is activated to crank the engine 110.

Thereafter, when a difference of rotational speeds between the engine 110 and the motor 140 comes within a predetermined range, the engine clutch 130 is engaged, so that the engine 110 and the motor 140 drive the vehicle together (i.e., switch from EV mode to HEV mode). If an engine-off condition is satisfied, e.g., the vehicle decelerates, then the engine clutch 130 opens and the engine 110 stops (i.e., switch from HEV mode to EV mode). At this time, the battery (not shown) is charged by using the driving wheels via the motor 140 serving as a generator, which is called as regeneration of braking energy, or regenerative braking. Accordingly, since the starter-generator motor 121 serves as a starter motor when cranking the engine, and as a generator once the engine cranked or when regenerating rotational energy of the engine after it turned off, it may be called as a Hybrid Starter Generator (HSG).

Generally, a multi-speed transmission such as a 2-or-higher-speed transmission or a transmission with a multi-plate clutch, i.e., Dual Clutch Transmission (DCT) may be used as transmission 150.

As a HEV with a multi-speed transmission accelerates from stop, upshifts from $1^{st}$ gear to $2^{nd}$, and from $2^{nd}$ to $3^{rd}$ are sequentially made. This type of upshift which is induced by an acceleration may be referred to as "Power on Upshift."

Since, while gear-shifting in a power-on upshift being made, power transmission between the driving source and the wheels is momentarily disengaged, an acceleration loss (G-loss) resulted from the vehicle losing power due to the disengagement occurs. The acceleration loss (G-loss) can be reduced by way of increasing an input torque to the transmission during a torque phase of upshift in case where the vehicle is accelerated by comparatively low APS (Accelerator Position Sensor) values. However, in case of quick acceleration with high APS values, it is difficult to reduce the acceleration loss. This will be described below in reference to the FIG. 2.

FIG. 2 represents an example of a quick acceleration process of the conventional HEV.

In reference to FIG. 2, when the HEV quickly accelerates, driving force of the motor 140 is used at the initial sage of the acceleration, and after the engine cranked by the HSG 121 and the engine clutch 130 engaged, the acceleration proceeds by the summed torque from the engine 110 and the motor 140. Since the HSG 121 generally does not output any torque after the engine cranked, and the motor 140 and the engine 110, as the driving power source, already output the maximum torques, respectively, by high APS values, it is difficult to further obtain an additional torque from the power source in order to reduce an acceleration loss. Surely, it may be considered that the HSG 121 is made to generate a driving force, however, the HSG 121 is generally connected to the engine 110 via pulleys and its rotational speed (rpm) is higher than that of the engine multiplied by the pulley ratio. Accordingly, the HSG 121 is difficult to be used for reducing the acceleration loss since the engine would operate in a high rotational speed (rpm) in the quick acceleration and the HSG 121 cannot make a normal output while operating in a rotational speed (rpm) greater than that of the engine multiplied by the pulley ratio.

In conclusion, the conventional HEV has a difficulty in reducing acceleration loss in a quick acceleration.

SUMMARY

An object of the present disclosure is to provide a HEV providing improved sensation of acceleration and a method for controlling a motor for the same.

In particular, the present disclosure is to provide a HEV in which acceleration loss can be reduced by using a motor in an upshift process for a quick acceleration and a method for controlling a motor for the same.

Additional advantages, objects, and features of the disclosure will be set forth in part in the description which follows and in part will become apparent to those having ordinary skill in the art upon examination of the following or may be learned from practice of the disclosure. The objects and other advantages of the disclosure may be realized and attained by the structure particularly pointed out in the written description and claims hereof as well as the appended drawings.

To achieve the above objects, one embodied motor-controlling method of the present disclosure, for a HEV which comprises a first motor directly connected to an engine and a second motor located at an input side of a transmission, may comprise the steps of determining a requested torque, determining a compensation torque for compensating an acceleration loss in a shift process based on the requested torque, a torque of the second motor, a torque of the engine and information on the shift, determining an available torque of the first motor, and determining a final torque of the first motor based on the compensation torque and the available torque.

For example, the final torque determining step comprises a step of determining the lower torque between the compensation torque and the available torque to be the final torque.

For example, the compensation-torque determining step comprises a step of subtracting the second-motor torque and the engine torque from the requested torque.

For example, the subtraction is conducted for a torque phase in a power on up shift.

For example, the transmission information comprises at least one of a shift class, a shift phase, a current gear position in the transmission, a target gear position in the transmission, and a shift progress rate.

For example, the available-torque determining step comprises the steps of determining available power for the first motor based on a discharge limit of a battery and power consumption of the second motor, and determining the available torque based on the available power and a temperature and a rotational speed of the first motor.

For example, the determination of the available torque is made according to a predetermined maximum-torque map.

For example, the method further comprises a step of determining the final torque of the first motor to be zero, in case where at least one of a predetermined vehicle-speed condition and a first-motor temperature condition is not satisfied.

For example, the method further comprises a step of the determined final torque being output from the first motor.

On the other hand, a computer-readable storage medium according to an embodiment of the present disclosure stores a program which can implement the method described above.

A hybrid electric vehicle according to an embodiment of the present disclosure comprises a first motor directly connected to an engine, a second motor located at an input side of a transmission, and a first control unit configured to determine a compensation torque for compensating acceleration loss in a shift process, an available torque of the first motor, and a final torque of the first motor based on the compensation torque and the available torque, wherein the compensation torque is determined based on a requested torque, a torque of the second motor, a torque of the engine and transmission information.

For example, the first control unit determines the lower one of the compensation torque and the available torque to be the final torque.

For example, the first control unit determines the final torque by subtracting the second-motor torque and the engine torque from the requested torque.

For example, the first control unit determines the compensation torque for a torque phase in a power on upshift.

For example, the transmission information comprises at least one of a shift class, a shift phase, a current gear position in the transmission, a target gear position in the transmission, and a shift progress rate.

For example, the first control unit determines an available power for the first motor based on discharge limit of a battery and power consumption of the second motor, and determines the available torque based on the available power and a temperature and a rotational speed of the first motor.

For example, the determination of the available torque is made according to a predetermined maximum-torque map.

For example, the first control unit determines the final torque of the first motor to be zero, in case where at least one of a predetermined vehicle-speed condition and a first-motor temperature condition is not satisfied.

For example, the vehicle further comprises a second control unit configured to control the first motor based on a torque command corresponding to the final torque.

According to embodiments of the present disclosure, more improved sensation of acceleration can be obtained in a HEV.

In particular, according to the present disclosure, the sensation of acceleration can be improved by controlling a first motor to output a compensation torque for reducing acceleration loss in a power-on-upshift.

BRIEF DESCRIPTION OF THE FIGURES

FIG. 8 represents a flowchart of an example of motor-control procedures for reducing acceleration loss in a shift process.

DETAILED DESCRIPTION

Figure 1:
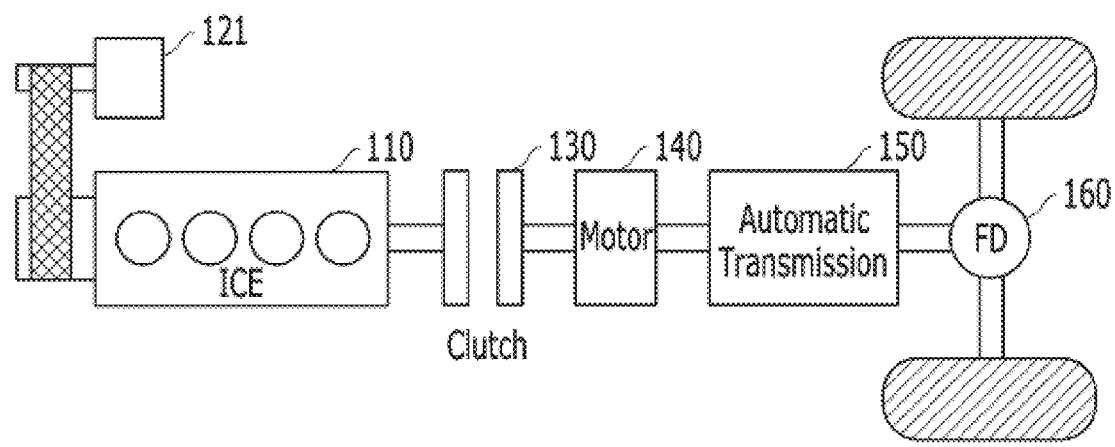
FIG. 1 represents a structure of a powertrain of a conventional HEV.
Figure 2:
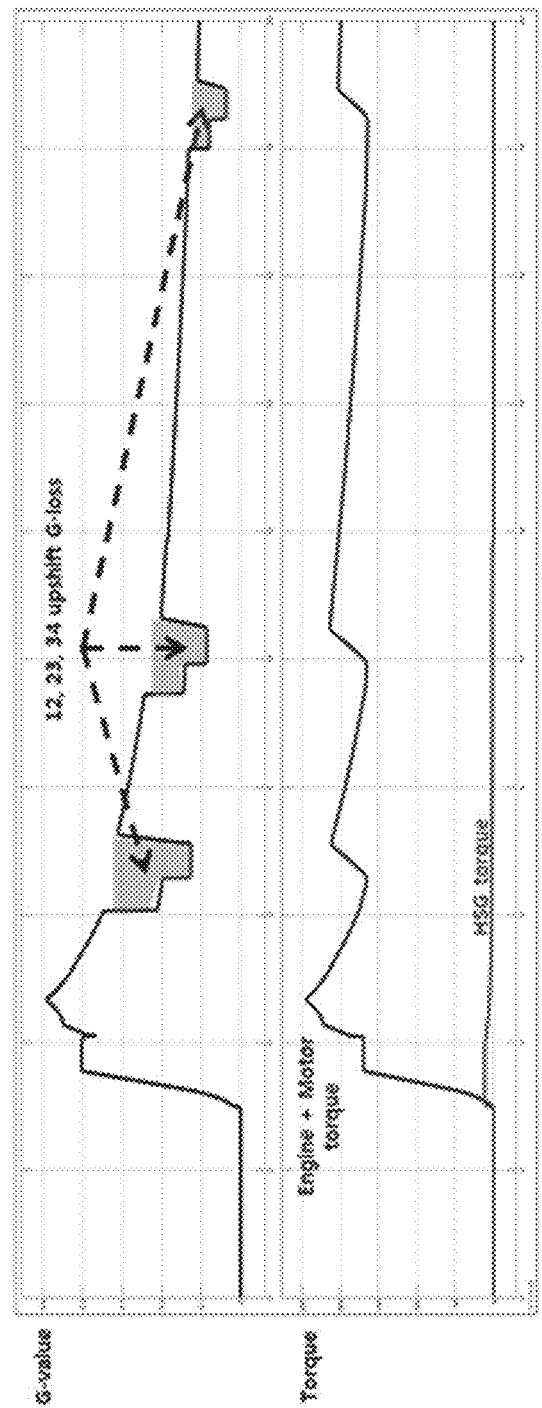
FIG. 2 represents an example of a quick acceleration process of the conventional HEV.

Hereinafter, embodiments of the present disclosure will be described in detail with reference to the accompanying drawings, and the same or similar elements will be given the same reference numerals regardless of reference symbols, and redundant description thereof will be omitted. In the following description, the terms "module" and "unit" for referring to elements are assigned and used interchangeably in consideration of convenience of explanation, and thus, the terms per se do not necessarily have different meanings or functions. Further, in describing the embodiments disclosed in the present specification, when it is determined that a detailed description of related publicly known technology may obscure the gist of the embodiments disclosed in the present specification, the detailed description thereof will be omitted. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

A singular expression includes the plural form unless the context clearly dictates otherwise.

In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

In addition, the term "unit" or "control unit" included in the names of a hybrid control unit (HCU), a motor control unit (MCU), etc. is merely a widely used term for naming a controller that controls a specific vehicle function, and does not mean a generic functional unit. For example, each controller may include a communication device that communicates with another controller or a sensor to control a function assigned thereto, a memory that stores an operating system, a logic command, input/output information, etc., and one or more processors that perform determination, calculation, decision, etc. necessary for controlling a function assigned thereto.

Before a method for controlling a motor to reduce acceleration loss in a shift process according to an embodiment of the present disclosure is described, a structure of a HEV and a control scheme applicable to embodiments of the present disclosure are described.

Figure 3:
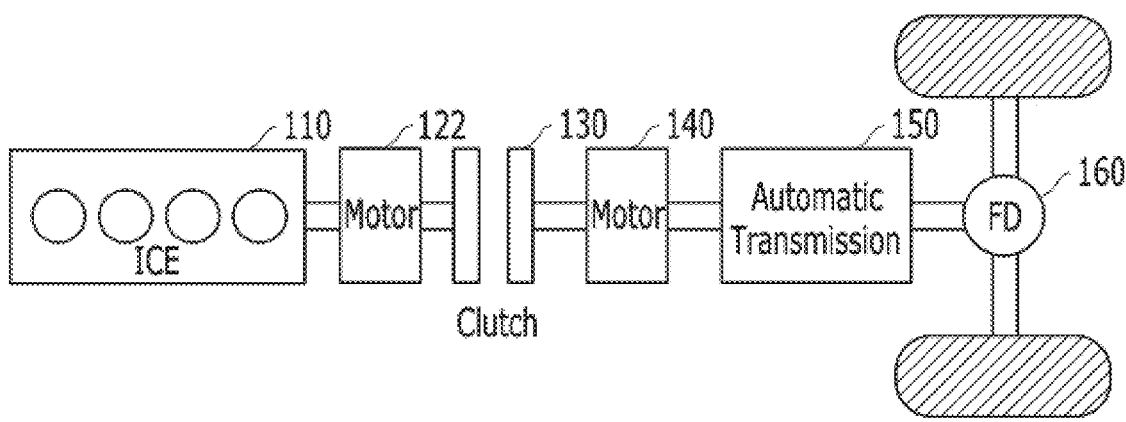
FIG. 3 represents an example of a power train of a HEV applicable to embodiments of the present disclosure.

FIG. 3 represents an example of a powertrain of a HEV applicable to embodiments of the present disclosure.

Since a structure of a powertrain of a HEV applicable to the embodiments is similar in many aspects to the structure of the parrel hybrid system represented in FIG. 1, differences will be mainly described below.

In FIG. 1, the HSG 121 is connected to the engine 110 via pulleys. However, in the powertrain of FIG. 3, a motor 122 corresponding to the HSG 121 is located between the engine clutch 130 and the engine 110 to be directly connected to the engine 110. It is advantageous that torque-control performance of the motor 122 can be improved due to the direct connection to the engine 110, and, due to no increase in rpm by a pulley ratio, the motor 122 can output a torque in spite of the engine 110 running in high rpm.

For the sake of describing convenience, in the following description, the motor 122 directly connected to the engine 110 is referred to as "first motor", and the driving motor 140 connected to an input side of the transmission 150 is referred to as "second motor."

Since the elements from the engine clutch 130 to in-between the wheels are similar to those of FIG. 1 described above, repetitive descriptions are omitted.

Figure 4:
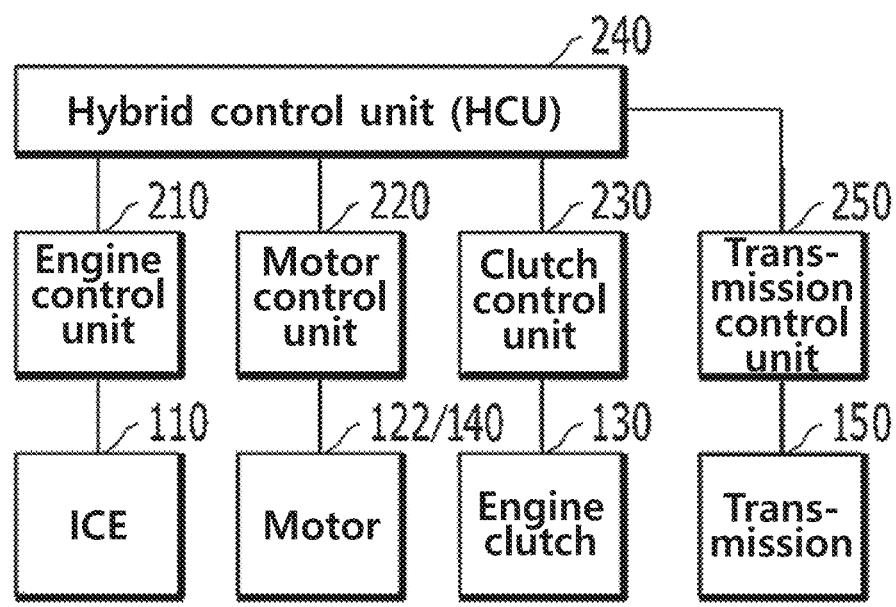
FIG. 4 represents an example of a control scheme for a HEV according to an embodiment of the present disclosure.

FIG. 4 represents an example of a control scheme for the HEV according to an embodiment of the present disclosure.

In reference to FIG. 4, in the HEV to which embodiments of the present disclosure can be applied, the internal combustion engine 110 may be controlled by an engine control unit 210, the first motor 122 and the second motor 140 by a motor control unit (MCU) 220 for their torques, and the engine clutch 130 by a clutch control unit 230. The engine control unit 210 may also be referred to as an engine management system (EMS). In addition, the transmission 150 is controlled by a transmission control unit 250.

Each control unit is connected to a hybrid control unit (HCU) 240 controlling the whole process of mode changes as an upper control unit, and, according to control of the HCU 240, provides to the HCU 240 information on driving-mode change, gear shift, control of the engine clutch 130, etc., and/or information necessary for engine-stop control, or performs actions according to control signals.

For example, the HCU 240 determines whether to perform a change in-between EV-HEV modes according to a driving state of the HEV. To this end, the HCU 240 determines when to open (i.e., disengage) the engine clutch 130, and performs a hydraulic pressure control for the opening. Also, the HCU 240 determines a state (lock-up, slip, open, etc.) of the engine clutch 130, and controls when to stop injecting fuel into the engine 110. Also, for the engine-stop control, the HCU may control regeneration of rotational energy of the engine by transmitting to the MCU 220 a torque command for controlling a torque of the first motor 122. In particular, in regards to embodiments of the present disclosure, the HCU 240 may determine an output torque of the first motor 122 for reducing acceleration loss in a power-on upshift.

It should be understood that the described control units and the function of each control unit and the way of distinguishing each control unit from the others are only examples and they are not limited by their names. For example, the HCU 240 may be integrated into one of the other control units so that the corresponding function can be provided by the integrated control unit, or the function may be distributed and integrated into two or more other control units.

The above-described structure of the HEV illustrated in FIGS. 3 and 4 is only an example, and it is obvious to a person of ordinary skill in the art that a HEV applicable to embodiments of the present disclosure is not limited to this structure.

In an embodiment of the present disclosure, when a HEV accelerated from stop with the accelerator pedal pressed over a predetermined threshold, it is suggested to control a toque of the first motor and thus compensate acceleration loss, so that the acceleration performance and the sensation of acceleration are improved.

Figure 5:
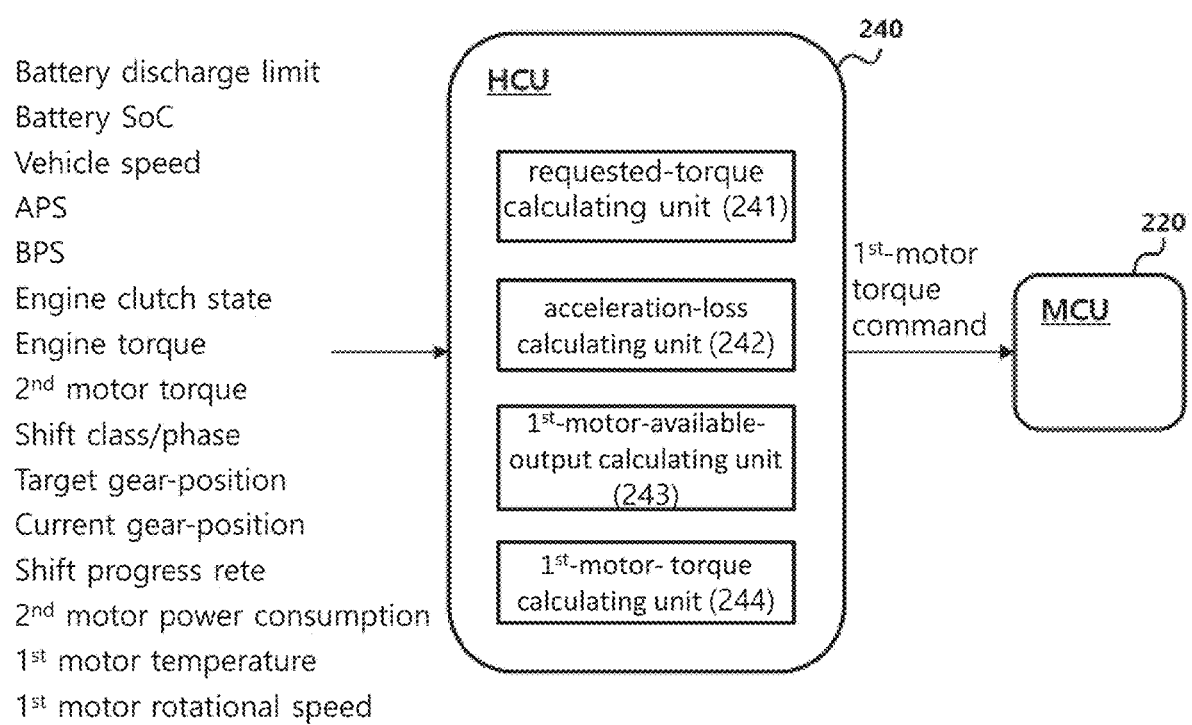
FIG. 5 represents an example of a controller for reducing acceleration loss in a shift process according to an embodiment of the present disclosure.

FIG. 5 represents an example of the control unit 240 for reducing acceleration loss in a shift process according to an embodiment of the present disclosure.

In reference to FIG. 5, to reduce the acceleration loss, the HCU 240 may determine a torque of the first motor based on various input information, and transmit a torque command corresponding to the determined torque to the MCU 220, and the MCU 220 may control the first motor 122 based on the torque command.

To this end, the HCU 240 may receive a discharge limit of a battery, a state of charge (SOC), a vehicle speed, an APS value, a brake-pedal-position-sensor (BPS) value, an engine-clutch state, an engine torque, a torque of the second motor, a shift class/phase, a target gear position in the transmission, a current gear position in the transmission, a shift progress rate, power consumption of the second motor, a temperature of the first motor, a rotational speed of the first motor, etc. as the input information.

The discharge limit of the battery and the SOC may be obtained from a battery management system (BMS), the vehicle speed from a vehicle-speed sensor, and the APS value and the BPS value from respective corresponding sensors. Also, the engine-clutch state may be obtained from the clutch control unit 230, the engine torque from the engine control unit 110, and the shift class/phase, the target gear position, the current gear position, and the shift progress rate from the transmission control unit 250. In addition, the torque of the second motor, the power consumption of the second motor, the temperature of the first motor, and the rotational speed of the first motor may be obtained from the motor control unit 220. It should be understood that the sources of the above-described information are only examples and the present disclosure is not limited thereto, so that sensed information may be transmitted via other control unit or after processed.

Also, the HCU 240 may comprise a requested-torque calculating unit 241, an acceleration-loss calculating unit 242, a first-motor-available-output calculating unit 243, and a first-motor-torque calculating unit 244.

The requested-torque calculating unit 241 may determine a torque requested by a driver based on the APS value, the BPS value, the discharge limit of the battery, and the SOC of the battery.

The acceleration-loss calculating unit 242 may calculate a base target torque of the first motor for compensating acceleration loss in an upshift process based on the driver's requested torque, the shift class/phase, the current gear position, the target gear position, the shift progress rate, the engine torque, and the second motor torque information.

Figure 6:
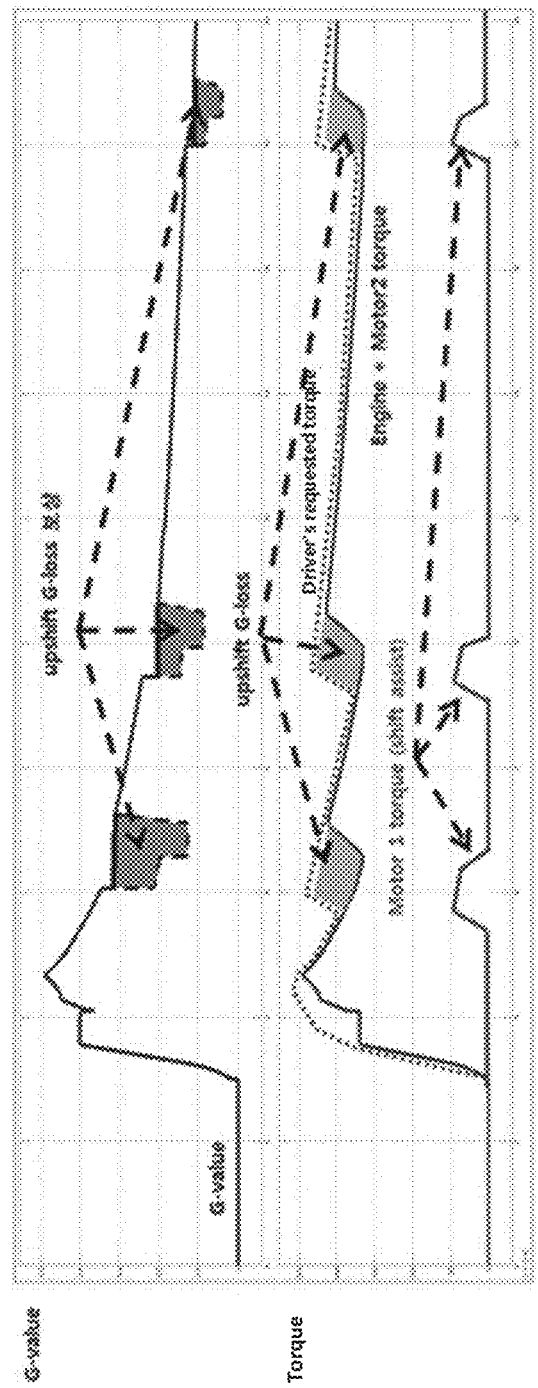
FIG. 6 represents a quick acceleration process to which acceleration-loss-reducing control is applied in a HEV according to an embodiment of the present disclosure.

The process of the acceleration-loss calculating unit 242 is described in reference to FIG. 6. FIG. 6 represents a quick acceleration process to which acceleration-loss-reducing control is applied in the HEV according to an embodiment of the present disclosure.

In reference to FIG. 6, a compensation torque for compensating acceleration loss may be defined as much torque as the sum of the engine torque and the second-motor torque does not satisfy the driver's requested torque. In other words, the compensation torque may have the value obtained by subtracting the engine torque and the second-motor torque from the driver's requested torque. Accordingly, the acceleration-loss calculating unit 242 may determine a compensation torque and decide it to be the base torque of the first motor, where it is determined based on the transmission information that the current shift is a power-on upshift and corresponds to a torque phase.

The first-motor-available-output calculating unit 243 may determine an available output (torque) of the first motor based on the discharge limit of the battery, the power consumption of the second motor, the temperature of the first motor and the rotational speed of the first motor. In detail, the first-motor-available-output calculating unit 243 determines first-motor available power which is available power which can be supplied to the first motor, by subtracting the power consumption of the second motor from the discharge limit of the battery. The maximum torque which can be exerted within the first-motor available power under the situation of the rotational speed and the temperature of the first motor may be the first-motor available torque.

Figure 7:
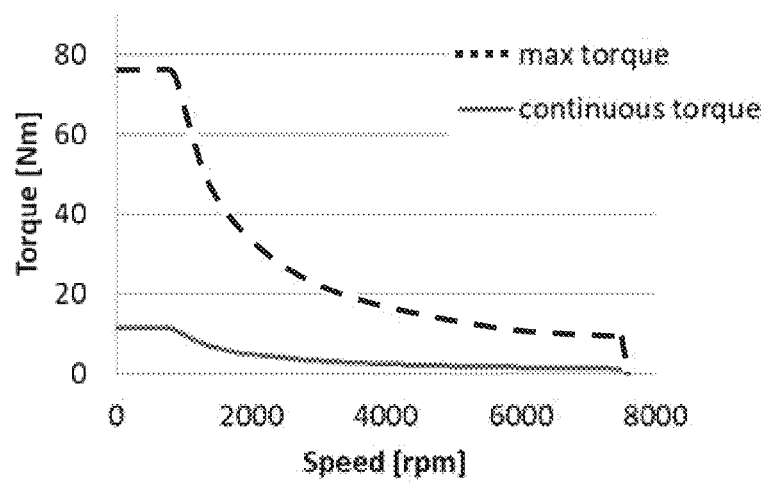
FIG. 7 represents an example of torque limit for a motor.

For example, for the maximum torque, the map of FIG. 7 may be referred to. FIG. 7 represents an example of torque limit for a motor. In reference to FIG. 7, the maximum torque of the first motor 122 may be predetermined for a range of rpm by operation type. Here, the operation type may comprise a temporary operation and a continuing operation, and since, in the embodiments of the present disclosure, the first motor 122 is not operated continuously, but temporarily to compensate acceleration loss at a torque phase in a shift process, the first-motor-available-output calculating unit 243 may refer to the max torque line of the temporary operation, the present disclosure is not limited thereto though.

The first-motor-torque calculating unit 244 may determine a final torque of the first motor 122 based on the base torque and the available torque of the first motor, and output to the motor control unit 220 a torque command corresponding to the determined torque. For example, the final torque of the first motor 122 may be determined to be the lower value between the base torque and the available torque.

The control procedures described above can be represented by the flowchart of FIG. 8.

FIG. 8 represents a flowchart of an example of motor-control procedures for reducing acceleration loss in a shift process.

In reference to FIG. 8, first, the requested-torque calculating unit 241 of the HCU 240 may determine the driver's requested torque based on the APS value, the BPS value, the vehicle speed, the discharge limit, and the SOC of the battery at S810.

Also, the HCU 240 may enter a motor control mode for reducing acceleration loss in the shift process, if a predetermined vehicle-speed condition at S820 and a predetermined first-motor temperature condition at S830 are determined to be satisfied (Yes in S830). The predetermined vehicle-speed condition may be satisfied if a vehicle speed is within a predetermined range, and the first-motor temperature condition satisfied if a temperature of the first motor 122 is below a predetermined temperature.

The reason for involving the vehicle-speed condition is because upshift such as $1^{st}$ gear to $2^{nd}$ generally does not occur with a sufficiently low vehicle-speed and acceleration variation is not large with the remaining available torque of the general driving source, i.e., the engine 110 and the second motor 140 comparatively large enough and the vehicle accelerated to a certain high speed (e.g., $4^{th}$-speed gear position).

Also, the reason for involving the first-motor temperature condition is because the first motor is difficult to output sufficient torque under its over-heated state despite the discharge limit of the battery high enough.

The detailed thresholds for the vehicle-speed condition and the first-motor temperature condition may be determined through a real test by vehicle, which the present disclosure is not limited to.

As both of the vehicle-speed condition (S820) and the first-motor temperature condition (S830) are determined to be satisfied (Yes in S830), the acceleration-loss calculating unit 242 and the first-motor-available-output calculating unit 243 may determine the base torque and the available torque of the first motor, respectively.

In detail, the acceleration-loss calculating unit 242 may determine the compensation torque for compensating acceleration loss based on the driver's requested torque, the shift class/phase, the current gear position, the target gear position, the shift progress rate, the engine torque, the second-motor torque information at S840A, and determine the compensation torque to be the base torque of the first motor at S850A.

Also, the first-motor-available-output calculating unit 243 may determine the first-motor available power which is the available power which can be supplied to the first motor, by subtracting the power consumption of the second motor from the discharge limit of the battery at S840B. The first-motor-available-output calculating unit 243 may determine the maximum torque exerted within the first-motor available power under the situation of the rotational speed and the temperature of the first motor to be the first-motor available torque at S850B.

The first-motor-torque calculating unit 244 may determine the lower torque between the base torque determined in the acceleration-loss calculating unit 242 and the available torque determined in the first-motor available output calculating unit 243 to be the torque of the first motor at S860.

If the vehicle-speed condition not satisfied (No in S820) or the first-motor temperature condition not satisfied (No in S830), the first-motor torque calculating unit 244 may determine the torque of the first motor to be zero at S870.

The first-motor torque calculating unit 244 may transmit to the motor control unit 220 a torque command corresponding to the determined torque, and the motor control unit 220 may control the first motor 122 to output the torque corresponding to the torque command at S880.

According to the embodiments of the present disclosure described above, acceleration loss can be reduced by controlling a torque of the first motor and thus sensation of acceleration in a shift process can be improved, in spite of the vehicle quickly accelerated by high APS values in a HEV having a multi-speed transmission.

On the other hand, the present disclosure described above may be embodied as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc. Therefore, the above detailed description should not be construed as restrictive and should be considered as illustrative in all respects. The scope of the present disclosure should be determined by a reasonable interpretation of the appended claims, and all modifications within the equivalent scope of the present disclosure are included in the scope of the present disclosure.

The invention claimed is:

1. A method for controlling a motor of a HEV comprising a first motor directly connected to an engine and a second motor located at an input side of a transmission, the method comprising:
    determining, by a control unit, a requested torque based on at least one of an accelerator position sensor (APS) value sensed by an APS, a brake pedal position sensor (BPS) value sensed by a BPS, a discharge limit of a battery, or a state of charge (SOC) of the battery, wherein the discharge limit and the SOC are transmitted from a battery management system (BMS);
    determining, by the control unit, a compensation torque for associated with compensating acceleration loss in a shift process of the transmission based on the requested torque, a torque of the second motor, a torque of the engine, and transmission information which is transmitted from a transmission control unit;
    determining, by the control unit, an available torque of the first motor; and
    determining, by the control unit, a final torque of the first motor based on the compensation torque and the available torque; and
    outputting the final torque from the first motor.

2. The method of claim 1, wherein determining the final torque comprises determining a lower torque between the compensation torque and the available torque to be the final torque.

3. The method of claim 1, wherein determining the compensation torque comprises subtracting the torque of the second motor and the engine torque from the requested torque.

4. The method of claim 3, wherein the subtraction is conducted for a torque phase in a power on upshift.

5. The method of claim 1, wherein the transmission information comprises at least one of a shift class, a shift phase, a current gear position in the transmission, a target gear position in the transmission, and a shift progress rate.

6. The method of claim 1, wherein determining the available torque comprises:
    determining available power for the first motor based on a discharge limit of a battery and power consumption of the second motor; and
    determining the available torque based on the available power and a temperature and a rotational speed of the first motor.

7. The method of claim 6, wherein determining the available torque is performed according to a predetermined maximum-torque map.

8. The method of claim 1, further comprising determining the final torque of the first motor to be zero, when at least one of a predetermined vehicle-speed condition and a first-motor temperature condition is not satisfied.

9. A non-transitory computer-readable medium having stored therein instructions executable by a processor, including instructions executable to perform a method of controlling a motor of a hybrid electric vehicle comprising a first motor directly connected to an engine and a second motor located at an input side of a transmission, the method comprising:
    determining a requested torque based on at least one of an accelerator position sensor (APS) value sensed by an APS, a brake pedal position sensor (BPS) value sensed by a BPS, a discharge limit of a battery, or a state of charge (SOC) of the battery, wherein the discharge limit and the SOC are transmitted from a battery management system (BMS);
    determining a compensation torque for compensating acceleration loss in a shift process of the transmission based on the requested torque, a torque of the second motor, a torque of the engine, and transmission information which is transmitted from a transmission control unit;
    determining an available torque of the first motor;
    determining a final torque of the first motor based on the compensation torque and the available torque; and
    outputting the final torque from the first motor.

10. A hybrid electric vehicle comprising:
    an engine;
    a transmission;
    a transmission control unit configured to control the transmission;
    a first motor directly connected to the engine;
    a second motor located at an input side of a transmission; and
    a first control unit configured to determine a compensation torque for compensating acceleration loss in a shift process of the transmission, an available torque of the first motor, and a final torque of the first motor based on the compensation torque and the available torque;
    wherein the first control unit is further configured to determine a requested torque based on at least one of an accelerator position sensor (APS) value sensed by an APS, a brake pedal position sensor (BPS) value sensed by a BPS, a discharge limit of a battery, or a state of charge (SOC) of the battery, wherein the discharge limit and the SOC are transmitted from a battery management system (BMS);

wherein the compensation torque is determined based on the requested torque, a torque of the second motor, a torque of the engine, and transmission information which is transmitted from the transmission control unit; and wherein the first control unit is configured to output the final torque from the first motor.

11. The hybrid electric vehicle of claim 10, wherein the first control unit determines a lower of the compensation torque and the available torque to be the final torque.

12. The hybrid electric vehicle of claim 10, wherein the first control unit determines the final torque by subtracting the torque of the second motor and the engine torque from the requested torque.

13. The hybrid electric vehicle of claim 12, wherein the first control unit determines the compensation torque for a torque phase in a power on upshift.

14. The hybrid electric vehicle of claim 10, wherein the transmission information comprises at least one of a shift class, a shift phase, a current gear position in the transmission, a target gear position in the transmission, and a shift progress rate.

15. The hybrid electric vehicle of claim 10, wherein the first control unit determines an available power for the first motor based on discharge limit of a battery and power consumption of the second motor, and determines the available torque based on the available power and a temperature of the first motor and a rotational speed of the first motor.

16. The hybrid electric vehicle of claim 15, wherein the determination of the available torque is made according to a predetermined maximum-torque map.

17. The hybrid electric vehicle of claim 10, wherein the first control unit determines the final torque of the first motor to be zero, when at least one of a predetermined vehicle-speed condition and a first-motor temperature condition is not satisfied.

18. The hybrid electric vehicle of claim 10, further comprising a second control unit configured to control the first motor based on a torque command corresponding to the final torque.

* * * * *